United States Patent
Sato (10) Patent No.: US 8,260,521 B2
(45) Date of Patent: Sep. 4, 2012

(54) VEHICLE DRIVE FORCE CONTROL SYSTEM

(75) Inventor: Masayuki Sato, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 307 days.

(21) Appl. No.: 12/693,682

(22) Filed: Jan. 26, 2010

(65) Prior Publication Data

US 2011/0022286 A1    Jan. 27, 2011

(30) Foreign Application Priority Data

Jan. 27, 2009   (JP) ................... 2009-015377

(51) Int. Cl.
*G06F 19/00* (2011.01)
*G06G 7/70* (2006.01)

(52) U.S. Cl. ......................................... 701/99
(58) Field of Classification Search ............ 701/99
See application file for complete search history.

(56) References Cited

U.S. PATENT DOCUMENTS

| | | | | |
|---|---|---|---|---|
| 5,775,293 | A | * | 7/1998 | Kresse ................... 123/396 |
| 6,035,827 | A | | 3/2000 | Heinitz et al. |
| 6,044,318 | A | * | 3/2000 | Bourdon et al. ............ 701/65 |
| 7,599,763 | B2 | | 10/2009 | Matsumoto et al. |
| 7,783,402 | B2 | * | 8/2010 | Sawada et al. ............ 701/38 |
| 2004/0107034 | A1 | * | 6/2004 | Togai et al. ............... 701/54 |
| 2006/0041353 | A1 | * | 2/2006 | Sawada et al. ............. 701/37 |
| 2006/0052908 | A1 | * | 3/2006 | Matsumoto et al. .......... 701/1 |
| 2009/0112439 | A1 | * | 4/2009 | Kuang et al. .............. 701/99 |

FOREIGN PATENT DOCUMENTS

| | | |
|---|---|---|
| EP | 1 632 382 A2 | 3/2006 |
| GB | 2332070 A | 6/1999 |
| GB | 2 454 338 A | 5/2009 |
| JP | 59-010750 A | 1/1984 |
| JP | 3-281962 A | 12/1991 |
| JP | 2006-117102 A | 5/2006 |
| JP | 2007-278082 A | 10/2007 |
| JP | 2008-213556 A | 9/2008 |

* cited by examiner

*Primary Examiner* — Mary Cheung
*Assistant Examiner* — Michael D Lang
(74) *Attorney, Agent, or Firm* — Carrier Blackman & Associates, P.C.; Joseph P. Carrier; William D. Blackman (57) ABSTRACT

When a vertical acceleration is applied to a vehicle, the foot of a vehicle operator placed on the accelerator pedal may apply an unintended force to the accelerator pedal owing to the shock of such accelerations and vibrations and/or the inertia force of the vehicle operator's foot applied to the accelerator pedal, and this may cause an inadvertent depressing or releasing of the accelerator pedal. To overcome this problem, an engine control unit corrects the output signal of an accelerator pedal that governs the output of the engine according to the detected vertical acceleration of the vehicle so that the unintended change in the output of the engine which is caused by an external force applied to the accelerator pedal and may cause an unintended acceleration or deceleration of the engine can be canceled.

18 Claims, 5 Drawing Sheets

VEHICLE DRIVE FORCE CONTROL SYSTEM

TECHNICAL FIELD

The present invention relates to a technology for eliminating the influences of external forces that may be applied to an accelerator pedal owing to accelerations and vibrations of the vehicle, and in particular to a vehicle drive force control system configured to compensate for the influences of external forces on an accelerator pedal and thereby provide a smooth ride.

BACKGROUND OF THE INVENTION

A vehicle is exposed to various accelerations and vibrations which are caused by the road conditions and the acceleration/deceleration of the vehicle, and such accelerations and vibrations may be directed in the fore-and-aft, vertical and lateral directions. When a vehicle operator is exposed to such an acceleration or vibration condition while stepping on an accelerator pedal, the foot of the vehicle operator placed on the accelerator pedal may apply an unintended force to the accelerator pedal owing to the shock of such accelerations and vibrations and/or the inertia force of the vehicle operator's foot applied to the accelerator pedal, and this may cause an inadvertent depressing or releasing of the accelerator pedal.

The movement of the accelerator pedal directly affects the drive force of the vehicle, and such an inadvertent fluctuation of the depression of the accelerator pedal owing to the accelerations and vibrations of the vehicle body is not desirable as it causes an unintended fore-and-aft acceleration or deceleration of the vehicle.

It has been proposed to detect or estimate an external force on an accelerator pedal caused by the vibrations of the vehicle, and control the reaction force of the accelerator pedal in dependence on the external force. See Japanese patent laid open publication No. 2006-117102 (patent document 1).

According to this prior art, the pedal reaction force is increased when the vehicle is vibrating so that the accelerator pedal is prevented from being depressed much further than the vehicle operator intends. However, this prior art requires a control mechanism for dynamically changing the reaction force of the accelerator pedal which is mechanically complex so that a large number of component parts are required and the manufacturing efficiency is reduced. Furthermore, if the vehicle operator tries to accelerate the vehicle when the vehicle is vibrating, the vehicle operator is required to depress the accelerator pedal more forcibly than usual, and this adds to the effort required for the vehicle operator to depress the accelerator pedal.

BRIEF SUMMARY OF THE INVENTION

In view of such problems of the prior art, a primary object of the present invention is to provide a vehicle drive force control system which is configured to compensate for the influences of external forces on an accelerator pedal caused by the accelerations and/or vibrations of the vehicle.

A second object of the present invention is to provide a vehicle drive force control system which prevents an unintended acceleration in the fore-and-aft direction even when the vehicle is subjected to accelerations and vibrations.

According to the present invention, such objects can be accomplished at least partly by providing a vehicle drive force control system, comprising: a driving component that drives a vehicle; an accelerator pedal that produces an output signal in dependence on a displacement thereof; a driving component control unit that controls an output of the driving component according to an output signal of the accelerator pedal; and a vibration sensor for detecting a vibration of the vehicle; wherein the driving component control unit is configured to correct the output signal of the accelerator pedal in dependence on the detected vibration of the vehicle. The vibration sensor typically consists of a sensor for detecting a vertical acceleration of the vehicle.

The driving component control unit corrects the output signal that governs the output of the driving component according to the detected vibration (typically consisting of the vertical acceleration) of the vehicle so that the unintended change in the output of the driving component (which may cause an unintended acceleration or deceleration of the driving component) caused by an external force applied to the accelerator pedal can be canceled.

When the driving component comprises a gasoline engine, the output signal of the accelerator pedal may correspond to an opening of a throttle valve and/or an amount of fuel injection. When the driving component comprises a diesel engine, the output signal of the accelerator pedal may correspond to an amount of fuel injection. When the driving component comprises an electric motor, the output signal of the accelerator pedal may correspond to electric power supplied to the electric motor.

According to a preferred embodiment of the present invention, the driving component control unit corrects the output signal of the accelerator pedal so as to cancel a change in the output signal caused by an external force applied to the accelerator pedal, the external force being caused by a mass placed on the accelerator pedal and subjected to the vibration of the vehicle. The driving component control unit may be configured to evaluate a skill of a vehicle operator and adjust an extent by which the output signal of the accelerator pedal is corrected.

The driving component control unit may comprise a map that gives a correction value for the output signal in dependence on the vibration of the vehicle. The map may be a fixed map, or may be manually adjustable by using an adjustment switch so that the property of the system may suit each particular vehicle operator.

The driving component control unit may further comprise a map creating unit that records data on a relationship between the vibration of the vehicle and resulting changes in the output signal, and creates the map according to the recorded data. The map is thereby configured to suit the particular vehicle operator, and the performance of the vehicle drive force control system may be optimized for a wide range of vehicle operators.

If the output signal exceeds a normal operating range, the system could be overloaded or otherwise inconvenienced. To avoid this from occurring, the driving component control unit may further comprise a limiter that limits the corrected output signal within a prescribed range.

Also, if the vehicle drive force control system is activated even when the vehicle is traveling over a smooth road surface, the comfort of the vehicle occupant may be impaired. Therefore, according to a preferred embodiment of the present invention, the driving component output control unit is incorporated with a dead zone that prohibits correction of the output signal when the detected vibration or an amount of correction for the output signal warranted by the detected vibration is smaller than a prescribed level.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
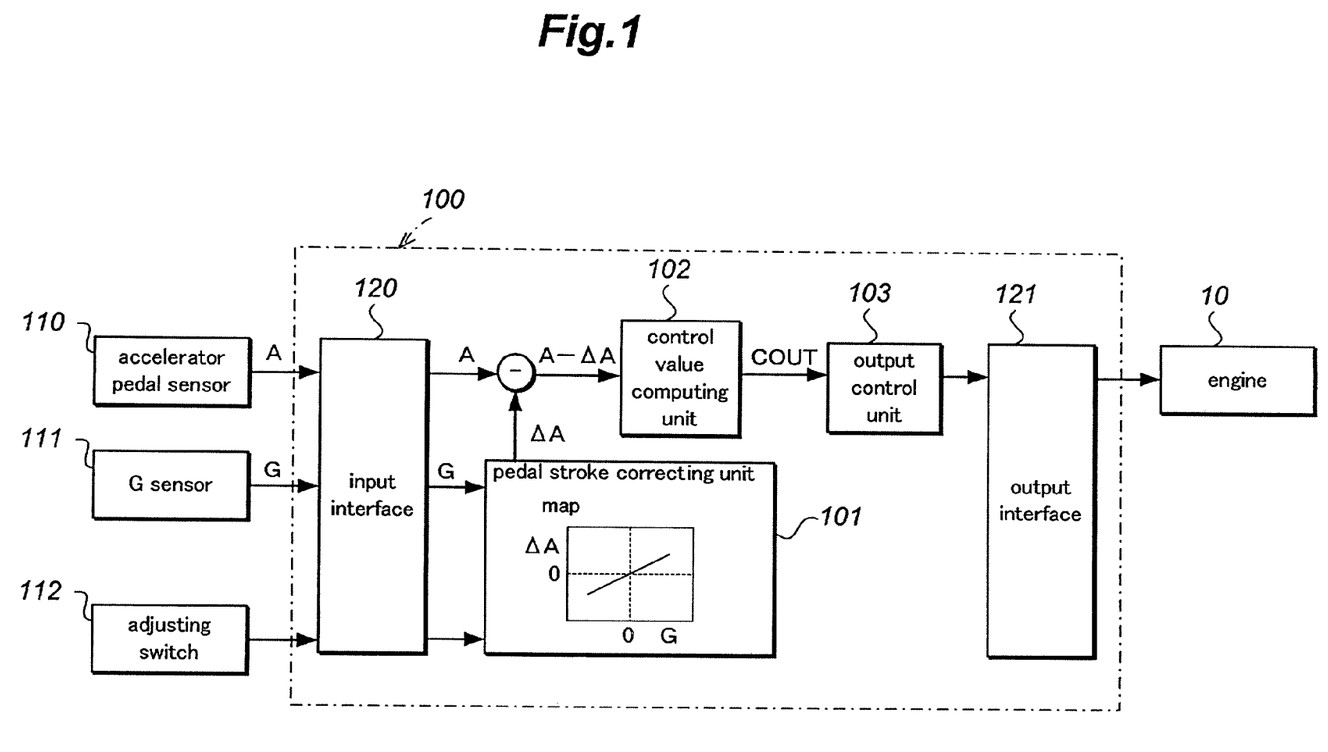
FIG. 1 is a block diagram of a vehicle drive force control system embodying the present invention.

FIG. 1 shows a functional block diagram of a vehicle drive force control system embodying the present invention which is essentially implemented by a ECU (electronic control unit) 100 configured to execute a certain computer program. The ECU 100 essentially consists of a computer, and comprises a processor (CPU) executing various arithmetic and logic computations, random access memory (RAM) providing a storage area for temporarily storing data and a work area for the operation of the processor, read only memory (ROM) storing the program for the processor and data required for the computation and rewritable non-volatile memory for storing results of computation executed by the processor and data obtained from various parts of the driving component which in this case consists of a gasoline internal combustion engine. The non-volatile memory may be replaced by RAM if it is equipped with a backup power source that maintain the supply of electric power to the RAM even after the system is shut down.

In addition to the ECU 100, the drive force control system comprises a accelerator pedal sensor 110 for detecting a depression or stroke of an accelerator pedal that governs the output of an engine of the vehicle, a G sensor (vibration sensor) 111 for detecting a vertical acceleration of the vehicle and an adjustment switch 112 which will be described hereinafter. In the illustrated embodiment, the engine 10 consists of a gasoline engine, and the accelerator pedal stroke is transmitted to an angular movement or an opening of a throttle valve and/or fuel metering elements of fuel injection nozzles which dictate the engine output.

The present invention may also be applied to other forms of engines as well. When the engine consists of a diesel engine, the pedal stroke would be transmitted to metering elements of fuel injection valves. If the engine consists of an electric motor, the pedal stroke would be transmitted to a controller for controlling the supply of electric power to the electric motor. The G sensor 111 detects the vertical acceleration of the vehicle in the illustrated embodiment, but may additionally include a fore-and-aft acceleration sensor and/or a lateral acceleration sensor. The vertical acceleration may also be obtained from stroke sensors of the wheel suspension system, or estimated from the output of a laser radar, an ultrasonic sensor or the like.

The ECU 100 comprises an input interface 120 that interfaces the accelerator pedal sensor 110, G sensor 111 and adjustment switch 112 with various functional components of the ECU 100 described in the following. The input interface 120 may include a AD converter for converting analog signals obtained from the sensors and switch into corresponding digital signals suitable for the use by the ECU 100.

The output of the G sensor 111 is forwarded to a pedal stroke correcting unit 101 that computes a pedal stroke correcting value AA by looking up a map incorporated therein. The output of the adjustment switch 112 is also forwarded to the pedal stroke correcting unit 101 to allow the map to be modified manually.

A pedal stroke correcting value $\Delta A$ produced by the pedal stroke correcting unit 101 is subtracted from the pedal stroke A detected by the accelerator pedal sensor 110, and this produces a corrected pedal stroke (A-$\Delta A$). The pedal stroke correcting value $\Delta A$ may be either positive or negative in value depending on the magnitude of the acceleration G. The corrected pedal stroke (A-$\Delta A$) is forwarded to a control value computing unit 102 which computes a control value COUT for the engine 10 according to the corrected pedal stroke (A-$\Delta A$). Here, the control value COUT corresponds to the throttle opening in the illustrated embodiment. The actual correction of the pedal stroke can be effected by using a suitable actuator, electric, pneumatic or hydraulic which may not be much different from the actuators used in cruise control systems or systems for automatically maintaining the speed of a vehicle. In the case of a steer-by-wire vehicle, the pedal stroke correction process may be implemented as an electric process.

If no measure is taken, the control value COUT could require a throttle opening greater than a full throttle opening, or a throttle opening smaller than a fully closed opening. To avoid such a situation from occurring, the control value computing unit 102 is incorporated with a limiter to limit the control value COUT based on the corrected pedal stroke (A-$\Delta A$) to be within the control range of the system or between 0% to 100% throttle opening.

The control value COUT is forwarded to an output control unit 103 which forwards a corresponding control command to the engine 10 via an output interface 121. As discussed earlier, the engine 10 may consist of a gasoline engine, a diesel engine, an electric motor or any other motor. The output interface 121 has the function to forward the control command computed by the ECU 100 to the engine 10. The output interface 121 may be incorporated with a DA converter for converting the digital control command into an analog control signal suitable for use in controlling the engine 10.

The details of the process of throttle opening correction executed in the illustrated embodiment are described in the following. As the vehicle travels over a road surface, an acceleration G is generated. This acceleration as it acts upon the mass "m" placed on the accelerator pedal causes an external force Fv=G*m that is applied to the accelerator pedal. The vehicle operator applies a certain foot pressure Fd to the accelerator pedal to produce an engine output which the vehicle operator desires. However, the vertical acceleration of the vehicle by acting upon the mass placed on the accelerator pedal applies an external force Fv to the accelerator pedal. Therefore, a combined force Fa (=Fd+Fv) is in fact applied to the accelerator pedal even though the vehicle operator intends to apply a foot pressure of Fd. Therefore, the vehicle may accelerate or decelerate owing to the external force Fv even though the vehicle operator does not intend such an acceleration or deceleration. Therefore, it is desirable to eliminate the effect of the external force Fv which is caused by the vertical acceleration of the vehicle. The mass "m" may vary from one vehicle operator to another. However, the mass "m" for a standard vehicle operator may be experimentally obtained from the actually measured acceleration G and external force Fv.

As the mass m is considered as a fixed value, the external force Fv can be obtained from the acceleration G, and the pedal stroke correcting value ΔA may be selected such that the effect of the external force Fv may be canceled. It can be accomplished by knowing the relationship between the changes in the force acting on the accelerator pedal and acceleration (typically, vertical acceleration) G acting on the vehicle body. More specifically, if the pedal stroke correcting value ΔA is selected so as to cancel a change in the pedal stroke by the external force Fd, the influence of the external force or the acceleration G on the engine output can be eliminated.

In the illustrated embodiment, the relationship between the acceleration G and pedal stroke correcting value ΔA required to cancel the influences of the acceleration G is defined in advance as a map stored in the memory of the ECU 100 so that the map may be looked up by the ECU 100 as required. Any variations in the mass m can be taken into account by suitably adjusting the relationship between the acceleration G and pedal stroke correcting value ΔA in the map.

Figure 2:
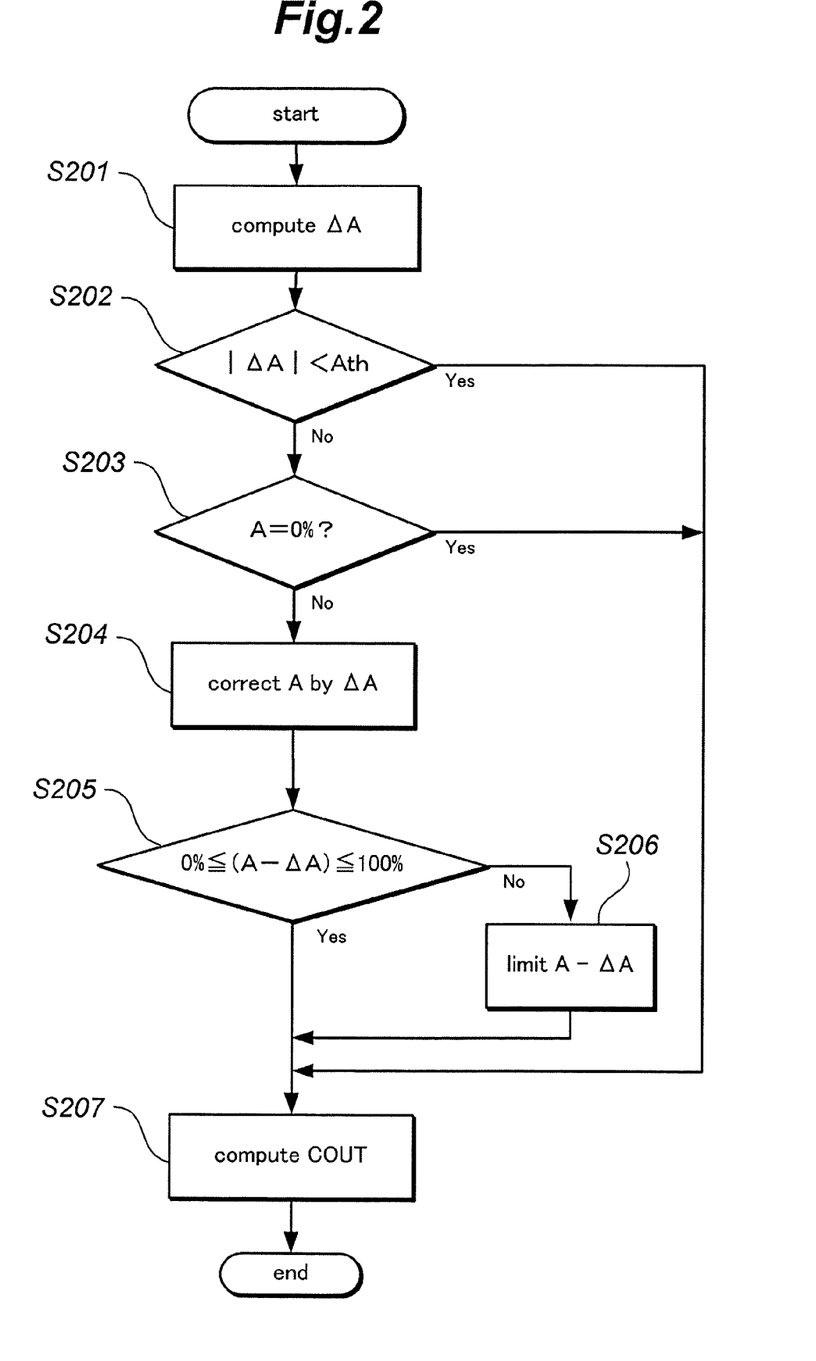
FIG. 2 is a flowchart of a control process executed in the vehicle drive force control system of the present invention.
Figure 3:
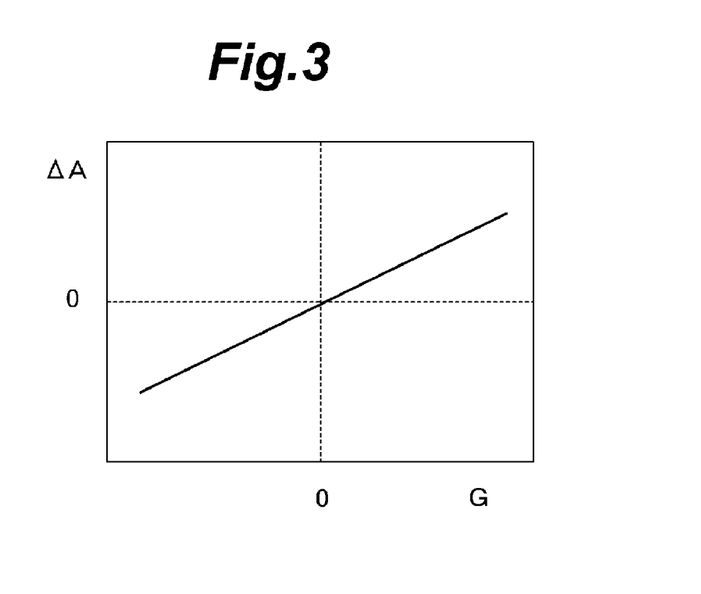
FIG. 3 is a graph representing a map used in the vehicle drive force control system to give a pedal stroke correcting value AA for each given vibration.

The correcting process of the illustrated embodiment is described in the following with reference to a flowchart of FIG. 2. This process is executed by the CPU of the ECU 100. The pedal stroke correcting unit 101 of the ECU 100 acquires the signal representing the acceleration G detected by the G sensor 111 via the input interface 120, and computes the pedal stroke correcting value ΔA by looking up the map (step S201). FIG. 3 is a graph representing such a map, the abscissa indicating the vertical acceleration G and the ordinate indicating the pedal stroke correcting value ΔA.

The pedal stroke correcting unit 101 then determines if the absolute value of the computed pedal stroke correcting value ΔA is within a prescribed range (dead zone) delimited by a threshold value Ath (step S202). This is based on the consideration that the ride comfort of the vehicle may be impaired if the throttle opening correction is executed even when the external force is very small such as when the vehicle is traveling over a paved smooth road surface. In this step, if the absolute value of the computed pedal stroke correcting value ΔA is smaller than Ath (step S202: Yes), such as when the absolute value of the computed pedal stroke correcting value ΔA is equal to or less than 5% of the full throttle opening, the control value computing unit 102 computes the control value COUT according to the pedal stroke A without any correction (step 207). Conversely, when the absolute value of the computed pedal stroke correcting value ΔA is greater than 5% of the full throttle opening (step S202: No), the program flow advances to step S203 where it is determined if the pedal stroke A is 0%. In the illustrated embodiment, the correction of the output signal is prohibited when an amount of correction for the output signal warranted by the detected acceleration is smaller than a prescribed level. It is also possible to arrange the system such that the correction of the output signal is prohibited when the detected (vertical) acceleration is smaller than a prescribed level.

If the pedal stroke A is 0% in step S203 (step S203: Yes), as it means that the vehicle operator's foot is not placed on the accelerator pedal or the vehicle operator is not applying any foot pressure to the accelerator pedal, it is not necessary or proper to perform a pedal stroke correction. Therefore, the program flow advances to step S207 where the control value computing unit 102 computes the control value COUT according the pedal stroke A without any correction.

If the pedal stroke A is not 0% in step S203 (step S203: No), the ECU 100 performs the pedal stroke correction by subtracting the pedal stroke correcting value ΔA from the pedal stroke A (step S204). The control value computing unit 102 then determines if the result of this subtraction (A−ΔA) is between 0% or zero load pedal stroke and 100% or full throttle opening (step S205). If the result of this subtraction (A−ΔA) is outside this range (step S205: No), as it is not practical that the result of this subtraction (A−ΔA) should be outside this range, the control value computing unit 102 forces the result of this subtraction (A−ΔA) to be within the prescribed range (between 0% and 100%) by executing a suitable subtraction operation (step S206) before the program flow advances to step S207. If the result of this subtraction (A−ΔA) is inside this range (step S205: Yes), the program flow directly advances to step S207.

At any event, in step S207, the control value computing unit 102 computes the control value COUT according to the result of this subtraction (A−ΔA), and the control value COUT is forwarded to the output control unit 103 which in turn forwards a corresponding control command to the engine 10 via the output interface 121.

Figure 4:
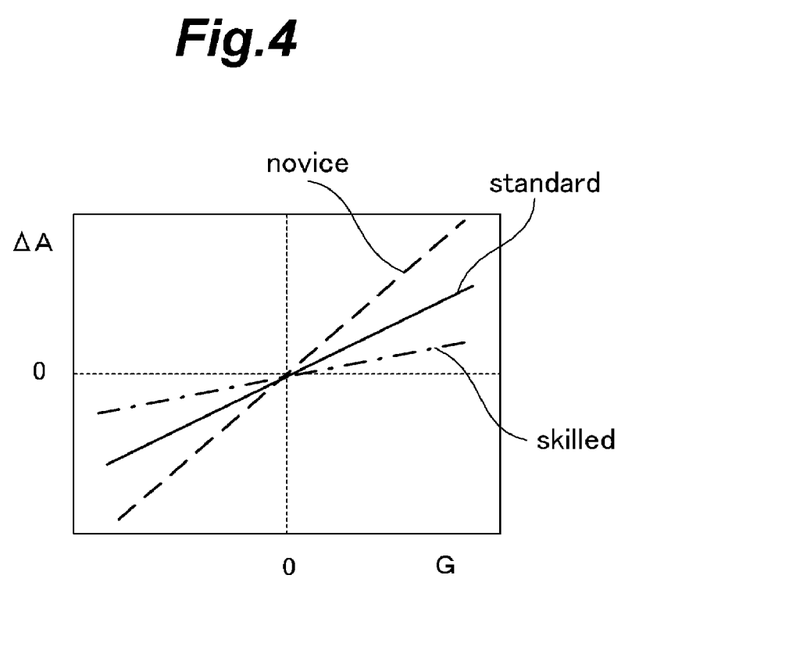
FIG. 4 is a graph showing how the map may be modified depending on the driving skill of the vehicle operator.

The map for computing the pedal stroke correcting value ΔA from the acceleration G may be configured to be adjusted manually in a number of different ways. For instance, it can be implemented by changing the inclination of the line representing the relationship between the pedal stroke correcting value ΔA and the acceleration G as indicated by the graph of FIG. 4. The foot pressure on the accelerator pedal may vary depending on the skill, experience, build and other factors of the vehicle operator. For instance, as indicated in FIG. 4, in the case of a novice vehicle operator, the foot pressure on the accelerator pedal may change significantly as the vehicle is subjected to a certain level of acceleration. On the other hand, a skilled vehicle operator may be able to maintain a fixed foot pressure on the accelerator pedal even when the vehicle is subjected to a same level of acceleration. Based on such a consideration, the inclination of the line in the graph of FIG. 4 may be made steeper for a novice or inexperienced vehicle operator than for a skilled or experienced vehicle operator.

The same goal may be achieved without changing the map. For instance, a factor of 0.5 may be multiplied to the pedal stroke correcting value ΔA for a standard vehicle operator, and a larger factor such as 0.7 may be used for an inexperienced vehicle operator while a smaller factor such as 0.3 may be used for an experienced vehicle operator. In this case, the map is not required to be changed. The modification of the map or the selection of the experience factor can be manually accomplished by using the adjustment switch 112 provided on the dashboard of the vehicle (see FIG. 1). Alternatively, this adjustment may be accomplished automatically by a vehicle operator skill estimating device which is configured to evaluate the skill of the vehicle operator from the behavior of the vehicle.

Figure 5:
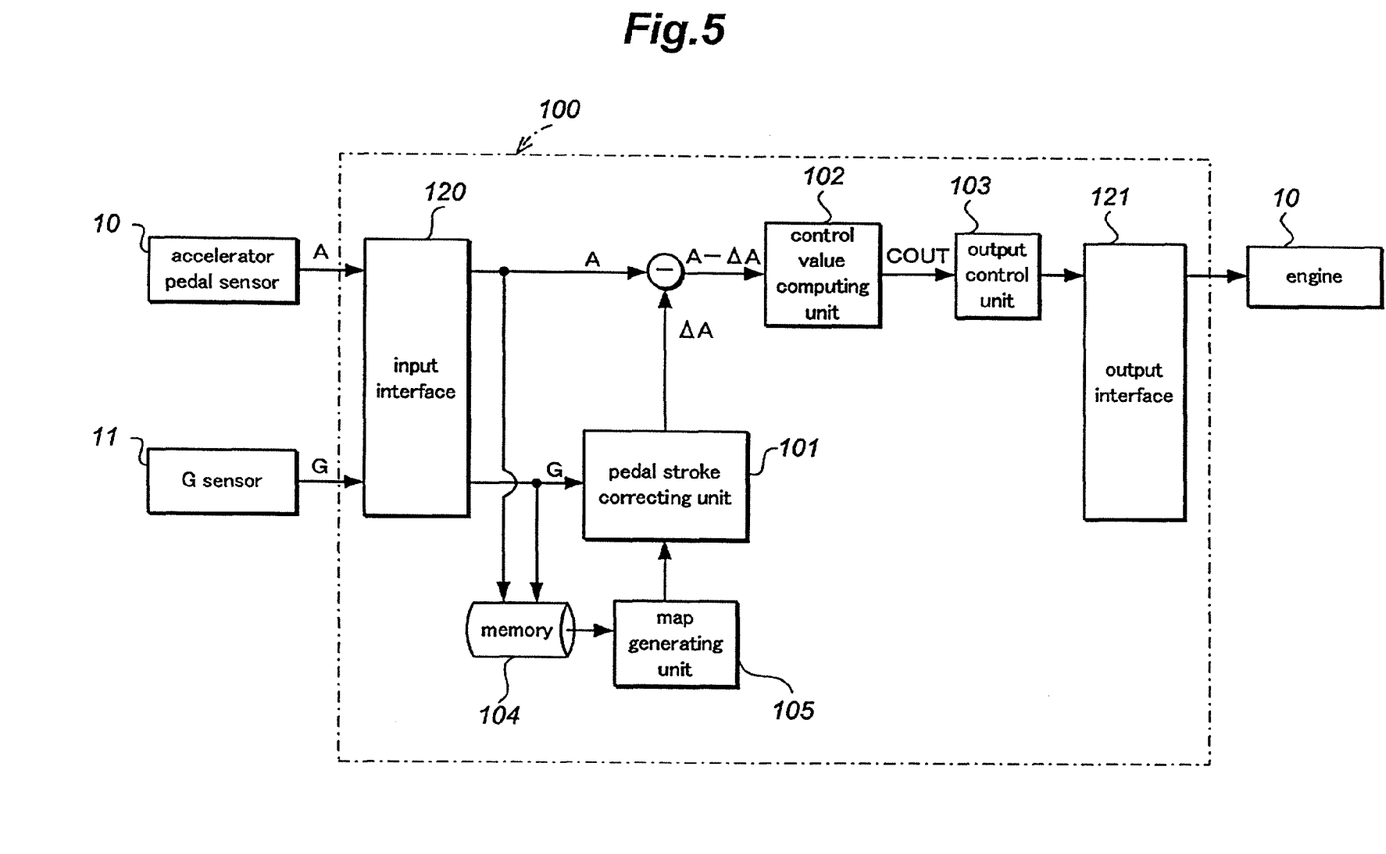
FIG. 5 is a block diagram of a second embodiment of the present invention.

FIG. 5 shows a second embodiment of the present invention. In FIG. 5, the parts corresponding to those of the previous embodiment are denoted with like numerals without repeating the description of such parts. In this embodiment, the ECU 100 is provided with memory 104 and a map generating unit 105 in association with the pedal stroke correcting unit 101.

Figure 6:
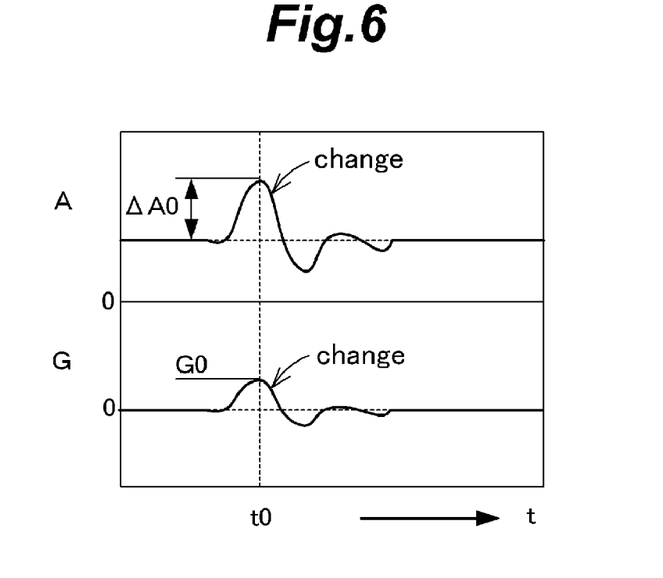
FIG. 6 is a graph showing changes in the pedal stroke A in relation to the changes in the vibration of the vehicle.

The ECU 100 collects data on the changes in the pedal stroke A in relation with the acceleration G of the vehicle body by storing the pedal stroke A detected by the accelerator pedal sensor 110 and the acceleration G detected by the G sensor 111 in the memory 104 at a prescribed sampling interval while the vehicle is traveling. More specifically, the map generating unit 105 records the pedal stroke A and acceleration G at the regular sampling interval in a time series as shown in the time chart of FIG. 6. The time chart records the pedal stroke A and acceleration G in relation with time. For instance, at time t0, an acceleration of G0 is experienced, and this caused a change of ΔA0 in the pedal stroke A. Such a relation between the acceleration level and the corresponding change in the pedal stroke A is recorded in the memory 104 at each sampling time.

Figure 7:
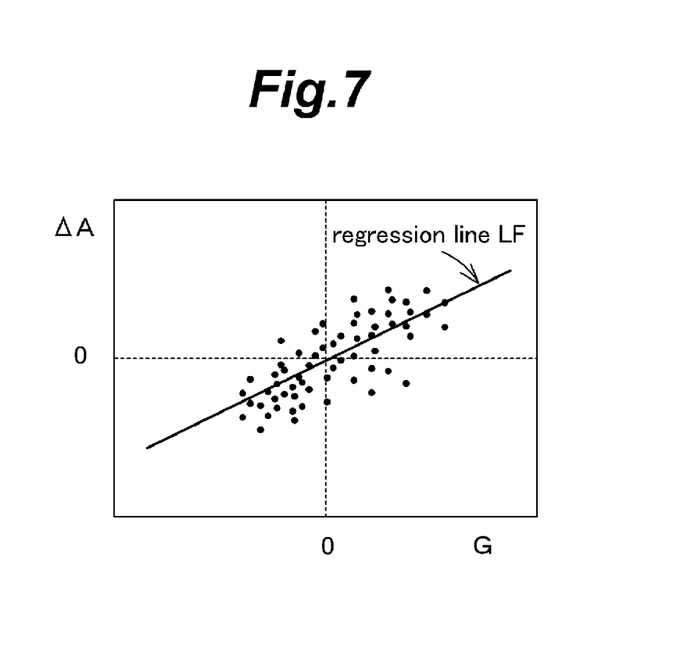
FIG. 7 is a chart showing how a map may be created from accumulated data on the changes in the pedal stroke A in dependence on the vibration of the vehicle.

When the acceleration G in relation to the corresponding change in the pedal stroke A is plotted at each sampling time, a chart as illustrated in FIG. 7 can be obtained. The abscissa of this chart represents the acceleration G, and the ordinate represents the change ΔA in the pedal stroke A. The map generating unit 105 determines a linear relationship LF between the acceleration G and change in the pedal stroke A by using a suitable technique such as a method of least squares, linear regression, and so forth. In the illustrated embodiment, the linear regression is applied to the acquired data to obtain a linear relationship LF between the acceleration G and change in the pedal stroke A. The map generating unit 105 creates a map according to the changes in the pedal stroke A or the foot behavior of the vehicle operator in relation with the acceleration of the vehicle, and provides this map to the pedal stroke correcting unit 101. Thereby, an optimum map can be created for each different situation, and the performance of the vehicle drive force control system can be optimized at all times without requiring any judgment on the side of the vehicle operator.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A vehicle drive force control system, comprising:
   a driving component that drives a vehicle;
   an accelerator pedal configured to be operated by a vehicle operator;
   an accelerator pedal sensor for detecting a pedal stroke of the accelerator pedal;
   a driving component control unit that controls an output of the driving component according to the detected pedal stroke of the accelerator pedal;
   a vibration sensor for detecting a vibration of the vehicle; and
   a pedal stroke correcting unit for computing a pedal stroke correcting value according to the vibration of the vehicle detected by the vibration sensor;
   wherein the driving component control unit controls an output of the driving component according to a control value obtained by subtracting the pedal stroke correcting value from the detected pedal stroke of the accelerator.

2. The vehicle drive force control system according to claim 1, wherein the vibration sensor detects a vertical acceleration of the vehicle.

3. The vehicle drive force control system according to claim 1, wherein the driving component comprises a gasoline engine, and the pedal stroke of the accelerator pedal corresponds to an opening of a throttle valve and/or an amount of fuel injection.

4. The vehicle drive force control system according to claim 1, wherein the driving component comprises a diesel engine, and the pedal stroke of the accelerator pedal corresponds to an amount of fuel injection.

5. The vehicle drive force control system according to claim 1, wherein the driving component comprises an electric motor, and the pedal stroke of the accelerator pedal corresponds to electric power supplied to the electric motor.

6. The vehicle drive force control system according to claim 1, wherein the pedal stroke correcting unit comprises a manual adjusting switch that allows an adjustment of an extent by which the pedal stroke of the accelerator pedal is corrected.

7. The vehicle drive force control system according to claim 1, wherein the pedal stroke correcting unit corrects the pedal stroke of the accelerator pedal so as to cancel a change in the pedal stroke caused by an external force applied to the accelerator pedal, the external force being caused by a mass placed on the accelerator pedal and subjected to the vibration of the vehicle.

8. The vehicle drive force control system according to claim 7, wherein the driving component control unit is configured to evaluate a skill of a vehicle operator and adjust an extent by which the pedal stroke of the accelerator pedal is corrected.

9. The vehicle drive force control system according to claim 7, wherein the pedal stroke correcting unit comprises a map that gives a pedal stroke correcting value in dependence on the vibration of the vehicle.

10. The vehicle drive force control system according to claim 9, wherein the pedal stroke correcting unit is configured to modify the map in dependence on a driving skill of a vehicle operator.

11. The vehicle drive force control system according to claim 9, wherein the pedal stroke correcting unit further comprises an adjustment switch for modifying the map.

12. The vehicle drive force control system according to claim 9, wherein the pedal stroke correcting unit further comprises a map creating unit that records data on a relationship between the vibration of the vehicle and resulting changes in the pedal stroke, and creates the map according to the recorded data.

13. The vehicle drive force control system according to claim 1, wherein the driving component control unit further comprises a limiter that limits the control value within a prescribed range.

14. The vehicle drive force control system according to claim 1, wherein the driving component control unit is incorporated with a dead zone that prohibits correction of the pedal stroke when the detected vibration or an amount of correction for the pedal stroke warranted by the detected vibration is smaller than a prescribed level.

15. The vehicle drive force control system according to claim 1, wherein the vibration sensor detects a vertical acceleration of the vehicle, and the pedal stroke correcting unit computes an external force created in a mass placed on the accelerator pedal by the vertical acceleration of the vehicle, the pedal stroke correcting value being computed based on said computed external force.

16. A vehicle drive force control system, comprising:
   a driving component that drives a vehicle;
   an accelerator pedal that produces an output signal in dependence on a displacement thereof;
   a driving component control unit that controls an output of the driving component according to an output signal of the accelerator pedal; and
   a vibration sensor for detecting a vibration of the vehicle;
   wherein the driving component control unit is configured to correct the output signal of the accelerator pedal in dependence on the detected vibration of the vehicle, and the driving component control unit is configured to evaluate a skill of a vehicle operator and adjust an extent by which the output signal of the accelerator pedal is corrected based on the evaluated operator skill.

17. The vehicle drive force control system according to claim 16, wherein the driving component control unit comprises a map that gives a correction value for the output signal in dependence on the vibration of the vehicle, and the driving component control unit is configured to modify the map in dependence on the evaluated operator skill.

18. The vehicle drive force control system according to claim 16, wherein the driving component control unit comprises a map that gives a correction value for the output signal in dependence on the vibration of the vehicle, and the driving component control unit further comprises an adjustment switch for modifying the map.

* * * * *